United States Patent
Glazemakers et al.

(10) Patent No.: US 9,866,519 B2
(45) Date of Patent: Jan. 9, 2018

(54) NAME RESOLVING IN SEGMENTED NETWORKS

(71) Applicant: Cryptzone North America, Inc., Waltham, MA (US)

(72) Inventors: Kurt Glazemakers, Grembergen (BE); Thomas Bruno Emmanuel Cellerier, Kungalv (SE)

(73) Assignee: CRYPTZONE NORTH AMERICA, INC., Waltham, MA (US)

( * ) Notice: Subject to any disclaimer, the term of this patent is extended or adjusted under 35 U.S.C. 154(b) by 0 days.

(21) Appl. No.: 15/289,764

(22) Filed: Oct. 10, 2016

(65) Prior Publication Data

US 2017/0111310 A1    Apr. 20, 2017

Related U.S. Application Data

(60) Provisional application No. 62/242,926, filed on Oct. 16, 2015.

(51) Int. Cl.
  *G06F 15/16* (2006.01)
  *H04L 29/12* (2006.01)
  *H04L 29/06* (2006.01)

(52) U.S. Cl.
  CPC ......... *H04L 61/1511* (2013.01); *H04L 63/00* (2013.01); *H04L 61/256* (2013.01); *H04L 61/2592* (2013.01)

(58) Field of Classification Search
  None
  See application file for complete search history.

(56) References Cited

U.S. PATENT DOCUMENTS

| | | |
|---|---|---|
| 5,889,942 A | 3/1999 | Orenshteyn |
| 6,381,631 B1 | 4/2002 | Van Hoff |
| 6,766,454 B1 | 7/2004 | Riggins |
| 6,898,710 B1 | 5/2005 | Aull |
| 7,444,518 B1 | 10/2008 | Dharmarajan et al. |
| 7,661,131 B1 | 2/2010 | Shaw et al. |
| 7,665,130 B2 | 2/2010 | Johnston et al. |
| 7,809,003 B2 | 10/2010 | Makela |
| 7,904,952 B2 | 3/2011 | Yeap et al. |
| 7,954,144 B1 | 5/2011 | Ebrahimi et al. |

(Continued)

FOREIGN PATENT DOCUMENTS

| | | |
|---|---|---|
| EP | 2144460 | 1/2010 |
| WO | 2006012612 | 2/2006 |
| WO | 2010069058 | 6/2010 |

OTHER PUBLICATIONS

AppGate 10.2.3 manual, 2004.

(Continued)

*Primary Examiner* — Natisha Cox
(74) *Attorney, Agent, or Firm* — Greenberg Traurig, LLP

(57) ABSTRACT

A method is provided, in one embodiment, which is performed on a client computing device, the method comprising: connecting the client with a plurality of segments of a private network, wherein the private network comprises a plurality of name resolving servers; registering the client as primary name resolving server for serving name requests for names in the private network received from applications on the client; and then forwarding the received name requests simultaneously to the plurality of name resolving servers.

14 Claims, 4 Drawing Sheets

(56) References Cited

U.S. PATENT DOCUMENTS

| | | |
|---|---|---|
| 8,001,610 B1 | 8/2011 | Chickering et al. |
| 8,353,021 B1 | 1/2013 | Satish et al. |
| 8,429,232 B1 | 4/2013 | Appenzeller et al. |
| 8,819,763 B1 | 8/2014 | Cheung et al. |
| 9,148,408 B1 | 9/2015 | Glazemakers et al. |
| 9,485,279 B2 | 11/2016 | Kirner et al. |
| 9,509,574 B2 | 11/2016 | Kirner et al. |
| 9,553,768 B2 | 1/2017 | Scott et al. |
| 2002/0026503 A1 | 2/2002 | Bendinelli et al. |
| 2002/0049914 A1 | 4/2002 | Inoue et al. |
| 2002/0093915 A1 | 7/2002 | Larson |
| 2003/0028805 A1 | 2/2003 | Lahteenmaki |
| 2003/0041091 A1* | 2/2003 | Cheline ............ H04L 29/12066 709/200 |
| 2003/0041136 A1 | 2/2003 | Cheline et al. |
| 2003/0055994 A1 | 3/2003 | Herrmann et al. |
| 2003/0131263 A1 | 7/2003 | Keane et al. |
| 2003/0145104 A1 | 7/2003 | Boden et al. |
| 2003/0200321 A1 | 10/2003 | Chen et al. |
| 2003/0237004 A1 | 12/2003 | Okamura |
| 2004/0044910 A1 | 3/2004 | Ylipieti |
| 2004/0073666 A1 | 4/2004 | Foster et al. |
| 2004/0078573 A1 | 4/2004 | Matsuyama |
| 2004/0088542 A1 | 5/2004 | Daude et al. |
| 2004/0167984 A1 | 8/2004 | Herrmann |
| 2005/0165889 A1* | 7/2005 | Muret .................. C07K 14/705 709/203 |
| 2005/0223095 A1 | 10/2005 | Volz et al. |
| 2005/0246767 A1 | 11/2005 | Fazal et al. |
| 2005/0273850 A1 | 12/2005 | Freund |
| 2005/0273853 A1 | 12/2005 | Oba et al. |
| 2006/0037072 A1 | 2/2006 | Rao et al. |
| 2006/0053296 A1 | 3/2006 | Busboom et al. |
| 2006/0059370 A1 | 3/2006 | Asnis et al. |
| 2006/0143702 A1 | 6/2006 | Hisada et al. |
| 2006/0190987 A1 | 8/2006 | Ohta et al. |
| 2006/0248337 A1 | 11/2006 | Koodli |
| 2007/0074049 A1 | 3/2007 | Frenkel et al. |
| 2007/0101405 A1 | 5/2007 | Engle et al. |
| 2007/0209081 A1 | 9/2007 | Morris |
| 2007/0299954 A1 | 12/2007 | Fatula |
| 2008/0028436 A1 | 1/2008 | Hannel et al. |
| 2008/0046995 A1 | 2/2008 | Satterlee et al. |
| 2008/0052775 A1 | 2/2008 | Sandhu et al. |
| 2008/0072312 A1 | 3/2008 | Takeyoshi et al. |
| 2008/0082640 A1 | 4/2008 | Chang et al. |
| 2008/0098472 A1 | 4/2008 | Enomoto et al. |
| 2008/0178278 A1 | 7/2008 | Grinstein et al. |
| 2008/0301801 A1 | 12/2008 | Jothimani |
| 2009/0031415 A1 | 1/2009 | Aldridge et al. |
| 2009/0113540 A1 | 4/2009 | Chandwani |
| 2009/0119749 A1 | 5/2009 | Datla et al. |
| 2009/0249440 A1 | 10/2009 | Platt et al. |
| 2010/0175124 A1 | 7/2010 | Miranda |
| 2010/0205657 A1 | 8/2010 | Manring et al. |
| 2010/0306530 A1 | 12/2010 | Johnson et al. |
| 2011/0016509 A1 | 1/2011 | Huang et al. |
| 2011/0107411 A1 | 5/2011 | McClain et al. |
| 2011/0307947 A1 | 12/2011 | Kariv et al. |
| 2012/0124239 A1* | 5/2012 | Shribman ........... H04L 61/1511 709/245 |
| 2012/0210002 A1 | 8/2012 | Mcquade |
| 2012/0278878 A1 | 11/2012 | Barkie et al. |
| 2013/0247142 A1 | 9/2013 | Nishizawa et al. |
| 2013/0332724 A1 | 12/2013 | Walters |
| 2014/0109175 A1 | 4/2014 | Barton et al. |
| 2014/0223541 A1 | 8/2014 | Yoon et al. |
| 2014/0282914 A1 | 9/2014 | Holmelin et al. |
| 2014/0351413 A1* | 11/2014 | Smith ................. H04L 61/1552 709/224 |
| 2015/0244711 A1 | 8/2015 | Venkataraman et al. |
| 2016/0099916 A1 | 4/2016 | Glazemakers et al. |
| 2016/0099917 A1 | 4/2016 | Glazemakers et al. |
| 2017/0111310 A1* | 4/2017 | Glazemakers ...... H04L 61/1511 |

OTHER PUBLICATIONS

Hidekazu, Suzuki et al., Design and Implementation of IP Mobility Communication Technology on User Space, DICOMO2014 Multimedia, Distributed, Cooperative, and Mobile Symposium, vol. 2014 No. 1, Information Processing Society of Japan, Jul. 2, 2014, pp. 1319-1325.

International Patent Application PCT/US2015/050485 International Search Report and Written Opinion, dated Jan. 12, 2016.

International Patent Application PCT/US2015/063783 International Search Report and Written Opinion, dated Mar. 1, 2016.

Shen, Yan et al., A Multi-Tunnel VPN Concurrent System for New Generation Network Based on User Space, 2012 IEEE 11th International Conference on Trust, Security and Privacy in Computing and Communications, IEEE, 2012, pp. 1334-1341.

Wang, Song et al., A distributed object-based IPSec multi-tunnels concurrent architecture, 2011 International Conference on Computational Problem-Solving (ICCP), IEEE, 2011, pp. 471-476.

European Patent Application No. 15848610.0, extended European search report, Sep. 5, 2017.

* cited by examiner

NAME RESOLVING IN SEGMENTED NETWORKS

RELATED APPLICATIONS

This application claims priority to U.S. Provisional Application Ser. No. 62/242,926, filed Oct. 16, 2015, entitled "NAME RESOLVING IN SEGMENTED NETWORKS," by Glazemakers et al., the entire contents of which application is incorporated by reference as if fully set forth herein.

TECHNICAL FIELD

At least some embodiments disclosed herein relate generally to the resolving of network addresses from host names for client devices, and more particularly but not limited to the resolving of host names for hosts located in a segmented private network.

BACKGROUND

In a segmented private network, devices located within a certain segment cannot reach devices within another segment over the same network connection. In order to reach devices within another segment, a second network connection must be setup with the other segment. Network connections with a specific segment may for example be established over a physical network interface by physically connecting to the segment or over a virtual network interface by establishing a networking tunnel with a gateway providing access to a certain segment.

A private network is a private communication network where each device reachable over the network is a communication device comprising a networking address. Such a networking address may be an IP or Internet Protocol address according to the IPv4 or IPv6 internet protocol. Under these protocols, a name resolving server is also known as a DNS or Domain Name System server. DNS is a hierarchical distributed naming system for computers, services, or any resource connected to the Internet or a private network. A network is a private network when the addressing space used is private. For IP addresses, the private IP address space follows the standards set by RFC1918 for Internet Protocol Version 4 (IPv4), and RFC4193 for Internet Protocol Version 6 (IPv6).

In the internet publication as retrieved by the link https://technet.microsoft.com/en-us/library/dd197552 on Aug. 6, 2015, it is disclosed how the resolving of network addresses is performed on client devices running the Windows operating system where primary and auxiliary DNS servers are assigned to each of the networking interfaces, whether physical or virtual. When a name query is received, the resolving is performed by the DNS client service as follows:

1. The DNS Client service sends the name query to the first or primary DNS server on the preferred adapter's list of DNS servers and waits one second for a response.
2. If the DNS Client service does not receive a response from the first DNS server within one second, it sends the name query to the first DNS servers on all adapters that are still under consideration and waits two seconds for a response.
3. If the DNS Client service does not receive a response from any DNS server within two seconds, the DNS Client service sends the query to all DNS servers on all adapters that are still under consideration and waits another two seconds for a response.
4. If the DNS Client service still does not receive a response from any DNS server, it sends the name query to all DNS servers on all adapters that are still under consideration and waits four seconds for a response.
5. If it the DNS Client service does not receive a response from any DNS server, the DNS client sends the query to all DNS servers on all adapters that are still under consideration and waits eight seconds for a response.

SUMMARY

Systems and methods to register a client computing device as a primary name resolving server for serving name requests for names in a private network are described herein. Some embodiments are summarized in this section.

An issue with the resolving sequence for the resolving of network addresses on client devices running the Windows operating system (discussed above) arises when a client is connected to a segmented private network comprising a plurality of name servers each for resolving addresses of only a subset of the hosts in the private network. This may for example occur when each segment comprises a separate name server for only resolving the hosts within a respective segment. In such a case, only one of the name servers will be reached in the first step of the above sequence, i.e., the primary name server. If this name server is not able to resolve the name request because the host is resolvable by the other, i.e., secondary, name server, it will respond that it is unable to find the requested host by a "can't find host" message. As the DNS client service receives a negative response, it removes every other name server assigned to the same adapter from its search list. Thereupon, the DNS client service may send the name request to the name servers assigned to the other adapters who will also answer in the negative. Therefore, the name request will result in a negative response to the requesting application after a considerable delay.

At least some embodiments disclosed herein overcome the above issue and provide a way to resolve name requests on a client computing device for a host in a segmented private network where the network comprises a plurality of name servers each for resolving addresses of only a subset of the hosts in the segmented private network. This is achieved, according to one embodiment, by a computer implemented method performed on a client computing device comprising the following steps: connecting the client with a plurality of segments of a private network, wherein the private network comprises a plurality of name resolving servers; registering the client as primary name resolving server for serving name requests for names in the private network received from applications on the client; and forwarding the received name requests simultaneously to the plurality of name resolving servers.

In this embodiment, the client itself thus functions as primary name resolving server for all connections with the private network. In other words, when a name request needs to be resolved for the private network, the client will issue a name resolving request to the client itself, i.e., to a service running on the client configured to serve such name resolving requests. This service then performs the forwarding step, i.e., every time it receives a name request, it forwards the name requests simultaneously to the plurality of name resolving servers.

As used herein, a primary name resolving server is the first name resolving server that the client will consult in order to resolve a name request. A name resolving server is a networking device running a name resolving service by listening for incoming name requests on a networking interface. The plurality of name resolving servers in the private network are thus local name servers which are not registered with a top level name server. This way, they may be not unique and may thus each resolve local names, i.e., names within the private network segment. Because of this, more than one resolved name request may return from the plurality of name resolving servers.

By the above method, the client does not need to wait for a time-out in order to have the name request sent to another name resolving server. In other words, name requests for hosts within the private network will all be served without further delay, irrespective of in which segment the hosts reside. Furthermore, as the forwarding step is done as if the client was a name server, the name resolving sequence of the prior art for determining the appropriate name server can remain as is. There is thus no change needed in an existing communication stack for which administrative privileges may be needed.

In one embodiment, the method further comprises: receiving resolved name requests from one or more of the plurality of name resolving servers; and providing a fastest-received resolved name request to one or more of the applications.

As the name requests are forwarded to the plurality of name resolving servers, it may occur that multiple resolved name requests are received in response, i.e., by receiving a resolved name request from more than one of the name resolving servers. In this case, the resolved name request that is received first is provided to the application that issued the name request. This way the name request is handled in the fastest way.

In one embodiment, the connecting may be performed over one or more network interfaces of the client and the registering may further comprise assigning the client as primary name resolving server to the one or more network interfaces. This is for example the way DNS servers are assigned in the Windows, Linux and iOS operating system.

In one embodiment, the connecting comprises establishing networking tunnels with gateways providing access to the respective segments. This allows connecting with a segment when the client cannot directly physically connect with one of the segments. Such a networking tunnel may be established by setting up a VPN or Virtual Private Network connection with the respective segment. For setting up such a networking tunnel, a virtual network interface may be created or be available. Such a virtual network interface is an abstract virtualized representation of a client's physical network interface that may or may not correspond directly to a physical network interface.

In one embodiment, the method further comprises: providing authentication information to an authentication server; and receiving upon successful authentication from the authentication server a listing of the plurality of name resolving servers. The client thus receives the network addresses of the name resolving servers independently from the connecting to the segments. This has the advantage that for the forwarding step, the network addresses of the name resolving servers do not have to be obtained from the operating system's network stack, but are directly available.

According to a further embodiment, the connecting further comprises: receiving a client access list in return upon successful authentication, wherein the client access list identifies a selection of networking devices in the private network that the client computing device is authorized to have network access to; establishing the networking tunnels with tunnel modules of the respective gateways providing network access to the private network; and sending the client access list over the networking tunnels to the gateways in order to enable the gateways to configure a firewall with firewall rules derived from the client access list to allow the client computing device network access to the selection of the networking devices in accordance with the firewall rules.

In the above paragraph, a networking device in the private network is a networking device providing a service in the private network. The networking device can receive networking packets addressed to it and reply to them in order to fulfill this service. Such a networking device may be an application server such as for example but not limited to a mail server providing a mail service, a file server providing networked data storage or a web server providing hosting services. A networking device may also be networking equipment such as for example routers or switches where the administrator access is then the service provided. All network access may further be accomplished according to the IP or Internet Protocol.

The client may thus be completely separated from the service providing networking devices and have, by default, no access to them. When the client establishes a tunnel with a gateway, it has access to a segment in the private network, but is still denied access from the networking devices within the segment of the private network as long as it doesn't provide the client access list to the gateway. When the client access list is provided to the gateway, the client has only network access to the networking devices in the list. This network separation between clients and service providing networking devices is safer than application level protection schemes as the client cannot inspect or look for vulnerabilities in devices it does not have access to.

This embodiment further allows centralized network access control, i.e., all access it controlled from the gateway making configuration simple and straightforward. The client access list further allows the client to know to which services it has access to. The client is thus not confronted by unexpected service failure because it knows which services it is authorized to access. As the firewall rules are client based, no application layer packet inspection is needed in the firewall. Also, Network Address Translation or NAT can be avoided as a protection mechanism because access is only possible from the networking tunnel.

In order to optimize the amount of messaging between the authentication server and the client, the plurality of name resolving servers may be specified in the client access list. The client then retrieves the networking addresses of the name resolving servers from the client access list in order to perform the forwarding of the name requests.

In this embodiment, advantageously the method then further comprises: receiving upon successful authentication from the authentication server a client tunnel list comprising information for establishing the networking tunnels; and using the client tunnel list for the establishing the networking tunnels. This adds further security to the system as an unauthenticated client will not even be allowed to establish the tunnel or will not even find the gateway.

In one embodiment, alternatively to specifying the plurality of name resolving servers in the client access list, the plurality of name resolving servers is specified in the client tunnel list.

In one embodiment, the client tunnel list may further comprise addressing information about the gateways and tunnel authentication information. The method then further comprises: retrieving the addressing information from the client tunnel list; sending requests to the tunnel modules by the addressing information together with the tunnel authentication information; and establishing the networking tunnels upon successful authentication with the tunnel modules.

In one embodiment, the client access list is readable by the client and the client access list further comprises a digital signature made by a key shared between the authentication server and the gateways thereby making the client access list not alterable by the client without notification from the gateways. The client thus has full access inside in the client access list before the firewall rules are actually applied. This allows signalling to the user of the client whether an networking device or application within the private network is reachable or not.

In one embodiment, a computer program product comprises computer-executable instructions for performing the methods above when the program is run on a computer. In one embodiment, a computer readable storage medium comprises the computer program product. In one embodiment, a data processing system is programmed for carrying out the methods above.

The present disclosure includes various methods, apparatuses (including computer systems) that perform such methods, and computer readable media containing instructions that, when executed by computing systems, cause the computing systems to perform such methods. Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 1:
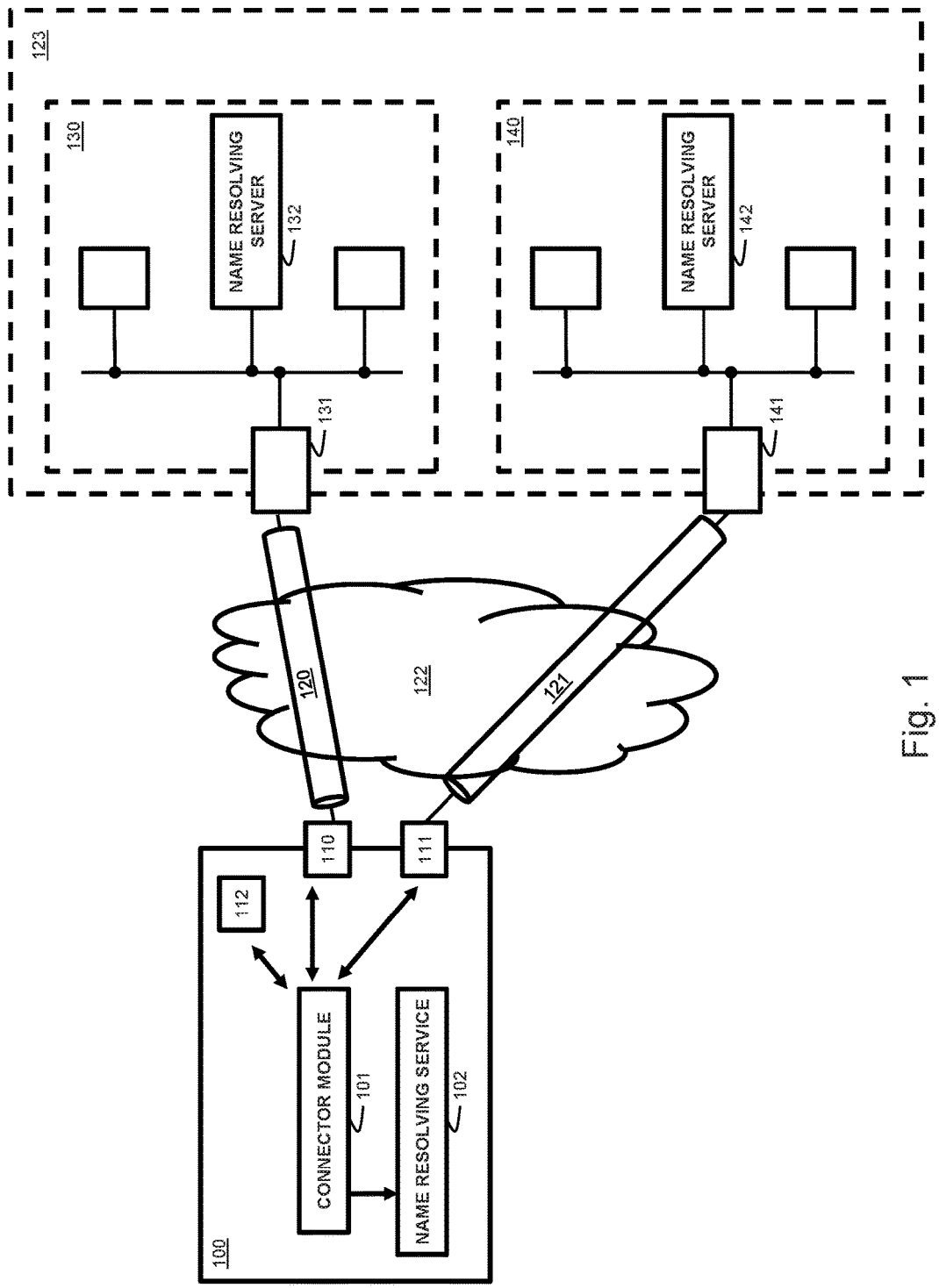
FIG. 1 illustrates a client connected by networking tunnels to different segments of a private network, according to one embodiment of the present disclosure.
Figure 2:
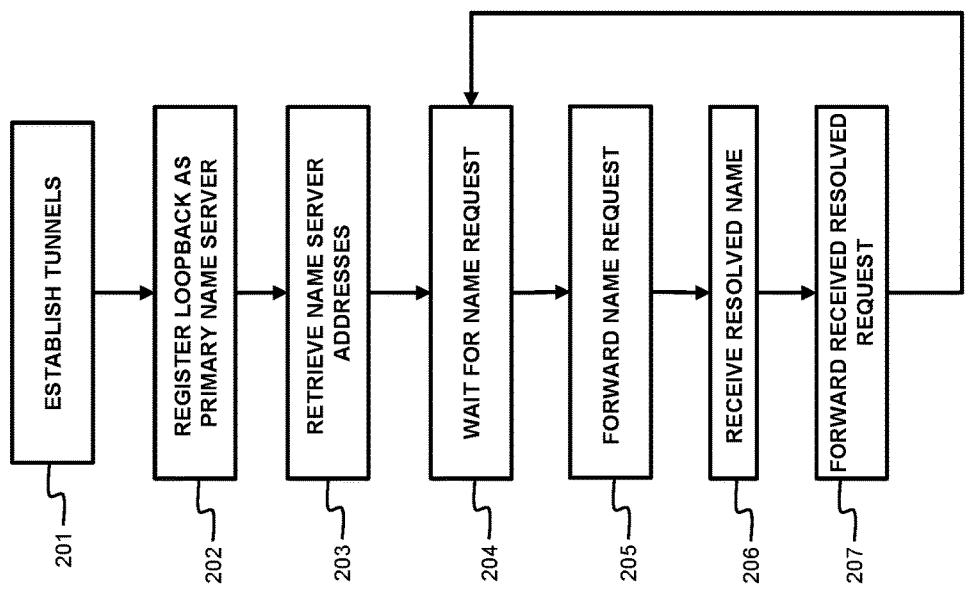
FIG. 2 illustrates a method performed by a client, according to one embodiment of the present disclosure.

FIG. 2 illustrates steps of a method performed on a client networking device according to an embodiment. FIG. 1 illustrates such a client in a network according to the same embodiment.

The networking client 100 may be any suitable networking device comprising at least one networking interface for communicating with other networking devices over a communication network. Client 100 further comprises a networking stack allowing applications and/or an operating system running on the client 100 to establish connections with remote applications over the networking interface.

Examples of suitable clients 100 are laptop computers, desktop computers, tablets and smartphones. A suitable networking stack is provided by most operating systems such as for example Windows from Microsoft, iOS from Apple, Android from Google or any other operating system based on the Linux, FreeBSD, Unix or BSD kernel.

The networking client 100 comprises a connector module 101. In a first step 201 of the method of FIG. 2, the connector module 101 establishes networking tunnels 120, 121 with segments of the remote private network 123. The private network 123 is segmented into networking segments. In the example of FIG. 1, there are two of such segments 130 and 140. The segments 130 and 140 are accessible from a communication network 122 such as for example the internet by gateways 131 and 141 respectively. By the segmentation of the private network 123, network access is restricted from one segment to the other. In one example, direct communication between segments 130 and 140 may be completely impossible thereby rendering the segments 130 and 140 into separate private networks 130 and 140.

The networking tunnels 120, 121 may further be established by a VPN or Virtual Private Network connection between the client's virtual network interfaces or adapters 110, 111 and the respective gateways 131, 141. By the VPN tunnels 120, 121, the client 100 becomes a networking device within the private network 123, i.e., within both segments 130, 140 of the private network 123. Otherwise put, by the establishing step 201, the virtual networking adapters 110, 111 obtain networking addresses in the same range of the private network such that client 100 can exchange networking packets with the networking devices in the private network as far as permitted by for example firewalls in the gateways 131, 141, switches etc.

The private network 123 further comprises name resolving servers 132, 142 for resolving networking addresses from the host names of networking devices in the private network 123. Name resolving for each segment is at least covered by one such name resolving server. Preferably, each segment comprises such a name resolving server configured to resolve name requests for networking devices in its respective segment. This way, a computing device in one segment cannot resolve a network address of the networking device in another segment, thereby increasing the safety of the private network 123.

The connector module 101 may be further embodied as a VPN client application running on the client device 100. The connector module 101 then uses the virtual network adapters 110, 111 provided by the networking stack on the client 100 to establish the networking tunnels 120, 121. This way, the connector module may run on the client 100 as a user-space application without requiring administrative privileges for establishing the networking tunnels.

In a next step 202, the connector module 101 registers the client 100 itself as primary or first name resolving server for each of the virtual network adapters 110, 111. This way, when a name request is issued by an application on the client 100 for a host residing in one of the segments 130, 140 of the private network, the name request will be routed to the client 100 itself. In one example, the name request will be routed by the networking stack of the client 100 to its loopback interface 112. In alternative embodiments, a different client adapter or IP can be used. When using the IPv4 addressing scheme, the loopback interface is typically addressed in the 127.0.0.0/8 addressing range. When using the IPv6 addressing scheme, the IPv6 address ::1 is typically used.

Client 100 further comprises a local name resolving service 102, i.e., a service for handling name resolving requests received (for example, over the loopback interface). In order to do so, the local name resolving service 102 listens for incoming name resolving requests on the appropriate ports of the loopback interface. When the DNS protocol is used, the port number 53 is used together with the UDP or User Datagram Protocol. In this case, the service 102 thus listens for incoming UDP packets on UDP port 53 of one of the virtual loopback interfaces.

In the next step 203, the name resolving service 102 then retrieves the networking addresses of the name resolving servers 132, 142. These addresses may be retrieved in different ways:

From the connector module 101.
From the client itself, i.e., the name resolving servers are stored on the client 100; for example, from a previous session or manually provided by a user of the client 100.
From the operating system running on the client 100 which has retrieved the name resolving servers during the setup of the tunnels in step 201. This may for example be the case when a dynamic network configuration protocol such as DHCP has been used to retrieve the networking parameters of the established connections with the segments 130, 140.
From an authentication server outside the private network 123 as explained in the embodiments below.

After performing steps 201 to 203, the client is setup to resolve name requests for hosts within the private network 123. In order to do so, the name resolving service performs the steps 204 to 207 continuously.

In step 204, the service 102 is in a waiting state for name requests. Then, at some point in time, a name resolving request is received. This request may originate from an application or from the operating system itself. Upon receiving the name request, service 102 proceeds to step 205 and simultaneously forwards the name request to the name resolving servers 132, 142 in the private network 123. In other words, it issues the name request to name resolving server 132 over the virtual network adapter 110 and thus over the networking tunnel 120, and it issues the name request to the name resolving server 142 over the virtual network adapter 111 and thus over the networking tunnel 121.

After some time, for example typically within a second, in step 206 the service 102 receives a name resolution in response. It may be the case that more than one response is received, for example when more than one name server is able to resolve the name request. In such a case, service 102 selects the name resolution that was first received and proceeds to step 207 where it returns the name resolution to the initial requestor over the loopback interface 112.

By the above sequence, it is always assured that a name resolution request to the primary name server for a host in the private network 123 is resolvable, i.e., there is no time-out upon which the networking stack has to fall back onto an auxiliary or second name server, or to a primary name server of another virtual network adapter.

Different instances of steps 204 to 207 may further be performed in parallel within the service 102. This way, service 102 is always in waiting state 204 to receive new incoming name request even while it is performing further steps 205 to 207 for another received name request.

In the example of FIG. 1, the client is connected to both segments 130 and 140 the networking tunnels 120, 121. Alternatively, client 100 may also be directly connected with a first one of the segments by a physical network connection and be connected with other segments by a networking tunnel from within this first segment.

Figure 3:
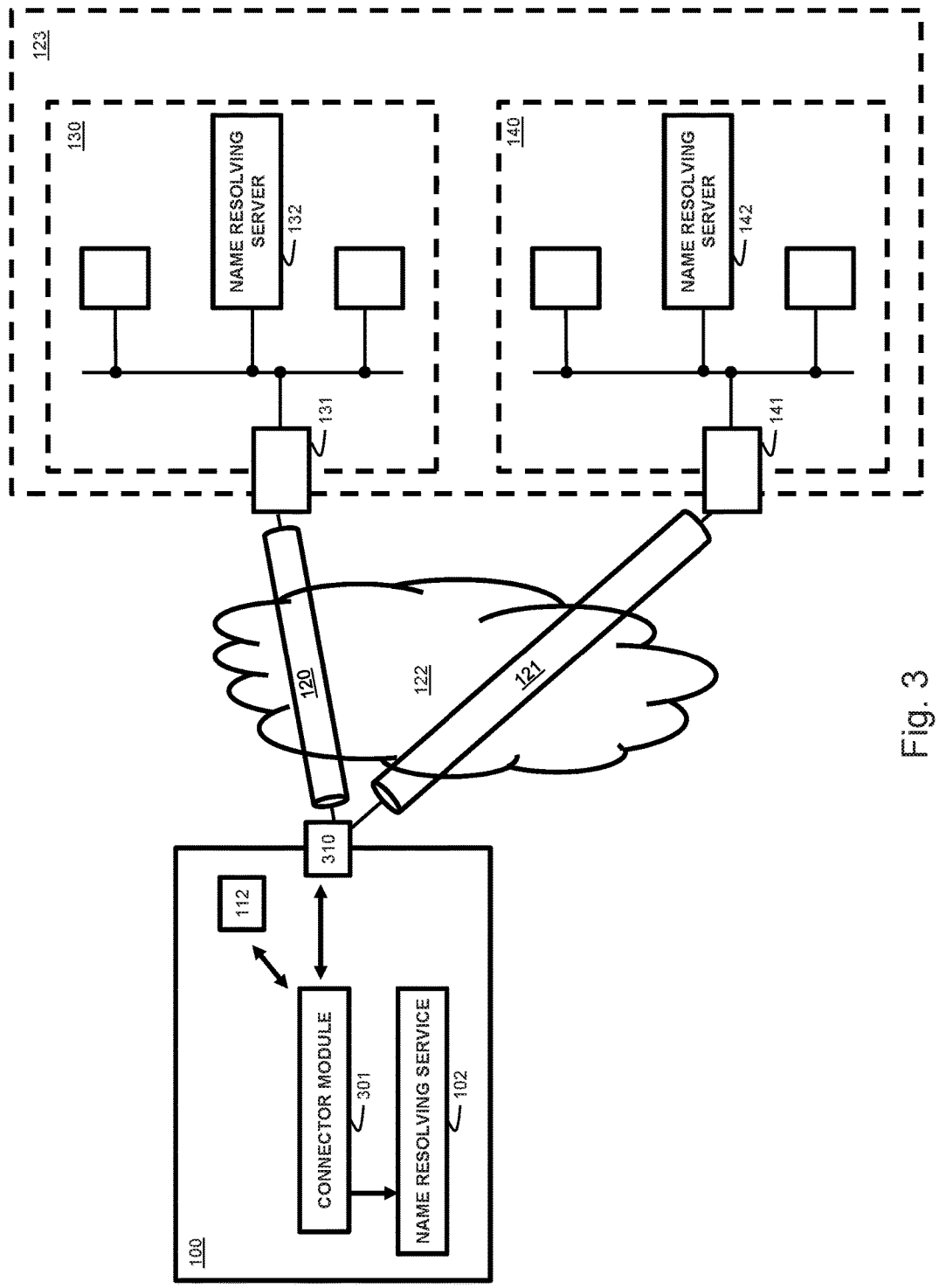
FIG. 3 illustrates a client connected by networking tunnels to different segments of a private network, according to one embodiment of the present disclosure.

In a further alternative embodiment, client 100 may also have different networking tunnels over the same virtual network adapter. This is shown in FIG. 3 where the same situation is depicted as in FIG. 1. For convenience, the same reference numbers are used where components have the same functionality or are structurally the same. During the connection step 201, connection module 301 now connects to the segments 130 and 140 by the same virtual network adapter 310. The further functionality of connection module 301 may be the same as connection module 101. This way, connection module 301 only has to register the loopback interface as primary name resolving server for the virtual network adapter 310. This has the advantage that no new virtual adapters need to be constructed when a connection to a new segment is desired. Because of this, a new connection with a segment can be setup without requiring administrative privileges.

In one embodiment, published patent application No. US 2016/0099917, filed Feb. 24, 2015, entitled "MULTI-TUNNELING VIRTUAL NETWORK ADAPTER," by Glazemakers et al., the entire contents of which is incorporated by reference as if fully set forth herein, discloses how multiple VPN tunnels over a single virtual adapter can be achieved.

In one embodiment, U.S. Pat. No. 9,148,408, filed Dec. 19, 2014, entitled "SYSTEMS AND METHODS FOR PROTECTING NETWORK DEVICES," by Glazemakers et al., the entire contents of which is incorporated by reference as if fully set forth herein, discloses functionality that can be used for the connector module 101.

In one embodiment, the retrieving of the name resolving servers in step 203 of FIG. 2 can be done from the authentication server. One way is to specify the network addresses of the name resolving servers in the client access list. The client access list then also specifies the firewall rule for the gateways such that the client can later access the name resolving servers in the private network. In other words, upon receipt of the client access list, connector module retrieves the network addresses of the name resolving servers and provides them to the name resolving service.

Alternatively, the addresses of the name resolving servers may be specified in the client tunnel list. This way, the client may already configure the name resolving service before providing the client access list to the gateways.

Various, non-limiting examples of systems and methods that generally relate to allowing access between a client device and other computing devices (e.g., servers and or other network devices) that can be used with the methods above in various embodiments are also described in U.S. Pat. No. 9,148,408, which was incorporated by reference above.

Figure 4:
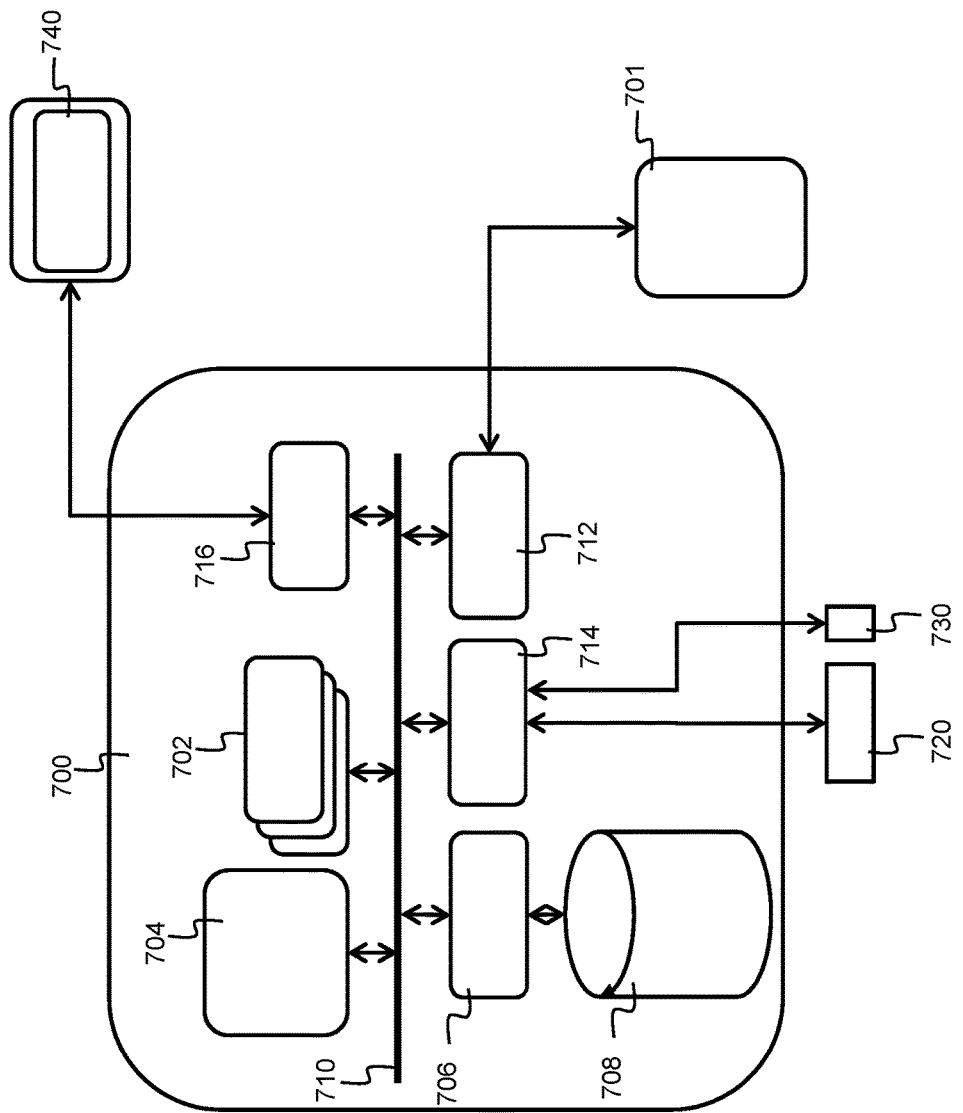
FIG. 4 shows a suitable exemplary computing system 700 for use in implementing the method of FIG. 2 in various embodiments.

FIG. 4 shows a suitable exemplary computing system 700 for implementing client 100 according to the above embodiments. Computing system 700 may in general be formed as a suitable general purpose computer and include a bus 710, one or more processor cores 702, a local memory 704, one or more optional input interfaces 714, one or more optional output interfaces 716, one or more communication interfaces 712, a storage element interface 706 and one or more storage elements 708. Bus 710 may include one or more conductors that permit communication among the components of the computing system 700. Processor cores 702 may include any type of conventional processor or microprocessor that interprets and executes programming instructions. Local memory 704 may include a random access memory (RAM) or another type of dynamic storage device that stores information and instructions for execution by processor cores 702 and/or a read only memory (ROM) or another type of static storage device that stores static information and instructions for use by processor 702. Input interface 714 may include one or more conventional mechanisms that permit an operator to input information to the computing device 700, such as a keyboard 720, a mouse 730, a pen, voice recognition and/or biometric mechanisms, etc. Output interface 716 may include one or more conventional mechanisms that output information to the operator, such as a display 740.

Communication interface 712 may include any transceiver-like mechanism such as for example one or more Ethernet interfaces that enables computing system 700 to communicate with other devices and/or systems 701. The communication interface 712 of computing system 700 may be connected to such another computing system by means of a local area network (LAN) or a wide area network (WAN) such as for example the internet. Storage element interface 706 may include a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, memory cards, . . . could be used. The system 700 described above may also run as a virtual machine above the physical hardware.

Steps performed according to the above processes may be implemented as computer-executable instructions. These instructions may then be executed on processor cores 702 upon performing the processes. This way, steps executed for various embodiments above may for example be implemented as instructions on computing system 700.

Data packet communication between the client and one or more servers may be performed over a networking interface 712. The computer-executable instructions may form or be part of a computer program product that is stored on storage element 708 or any computer readable storage medium.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include any data useful in the operation of the system.

Various functionality may be performed via a web browser and/or application interfacing utilizing a web browser. Such browser applications may include Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signalling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may be included in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. 112, sixth paragraph, unless the element is expressly recited using the phrase "means for." As used herein, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

The invention claimed is:

1. A method, comprising:
   connecting a client computing device with a plurality of segments of a private network, wherein network access is restricted from one segment to another of the plurality of segments, the private network comprises a plurality of name resolving servers, and each name resolving server is configured to resolve name requests for networking devices in a respective segment of the plurality of segments;
   registering the client computing device as primary name resolving server for serving name requests for names in the private network received from applications on the client computing device, the name requests including a first name request from a first application;
   in response to receiving the first name request, forwarding the first name request simultaneously to the plurality of name resolving servers;
   selecting a name resolution that is first received from the plurality of name resolving servers in response to the first name request; and
   returning the selected name resolution to the first application.

2. The method of claim 1, wherein the connecting is performed over one or more network interfaces of the client computing device, and wherein the registering comprises assigning the client computing device as primary name resolving server to the one or more network interfaces.

3. The method of claim 2, wherein the connecting further comprises establishing networking tunnels with gateways providing access to the respective segments.

4. The method of claim 2, wherein the one or more network interfaces correspond to virtual network interfaces.

5. The method of claim 3, further comprising:
   providing authentication information to an authentication server; and
   in response to successful authentication from the authentication server, receiving a listing of the plurality of name resolving servers.

6. The method of claim 4, further comprising:
   providing authentication information to an authentication server; and
   in response to successful authentication from the authentication server, receiving a listing of the plurality of name resolving servers.

7. The method of claim 5, wherein the connecting further comprises:
   in response to successful authentication, receiving a client access list in return, wherein the client access list identifies a selection of networking devices in the private network that the client computing device is authorized to access;
   establishing the networking tunnels with tunnel modules of the respective gateways providing network access to the private network; and
   sending the client access list over the networking tunnels to the gateways in order to enable the gateways to configure a firewall with firewall rules derived from the client access list to allow the client computing device network access to the selection of the networking devices in accordance with the firewall rules.

8. The method of claim 7, wherein the plurality of name resolving servers is specified in the client access list.

9. The method of claim 7, further comprising:
   in response to successful authentication from the authentication server, receiving a client tunnel list comprising information for establishing the networking tunnels; and
   using the client tunnel list for the establishing the networking tunnels.

10. The method of claim 9, wherein the plurality of name resolving servers is specified in the client tunnel list.

11. The method of claim 9, wherein the client tunnel list comprises addressing information about the gateways and tunnel authentication information, the method further comprising:
    retrieving the addressing information from the client tunnel list;
    sending requests to the tunnel modules by the addressing information together with the tunnel authentication information; and in response to successful authentication with the tunnel modules, establishing the networking tunnels.

12. The method of claim 7, wherein the client access list is readable by the client computing device, and wherein the client access list further comprises a digital signature made by a key shared between the authentication server and the gateways thereby making the client access list not alterable by the client computing device without notification from the gateways.

13. A non-transitory computer readable storage medium storing instructions configured to instruct a data processing system to:

connect a client computing device with a plurality of segments of a private network, wherein network access is restricted from one segment to another of the plurality of segments, the private network comprises a plurality of name resolving servers, and each name resolving server is configured to resolve name requests for networking devices in a respective segment of the plurality of segments;

register the client computing device as primary name resolving server for serving name requests for names in the private network received from applications on the client computing device, the name requests including a first name request from a first application;

in response to receiving the first name request, forward the first name request simultaneously to the plurality of name resolving servers;

select a name resolution that is first received from the plurality of name resolving servers in response to the first name request; and return the selected name resolution to the first application.

14. A system, comprising:

at least one processor; and memory storing instructions programmed to instruct the at least one processor to:

connect a client computing device with a plurality of segments of a private network, wherein network access is restricted from one segment to another of the plurality of segments, the private network comprises a plurality of name resolving servers, and each name resolving server is configured to resolve name requests for networking devices in a respective segment of the plurality of segments;

register the client computing device as primary name resolving server for serving name requests for names in the private network received from applications on the client computing device, the name requests including a first name request from a first application;

in response to receiving the first name request, forward the first name request simultaneously to the plurality of name resolving servers;

select a name resolution that is first received from the plurality of name resolving servers in response to the first name request; and return the selected name resolution to the first application.

\* \* \* \* \*